United States Patent [19]

Heidecker

[11] 3,879,752

[45] Apr. 22, 1975

[54] COMBINED SECTOR PULSE AND DATA DETECTION SYSTEM

[75] Inventor: Robert F. Heidecker, Longmont, Colo.

[73] Assignee: Iomec, Inc., Santa Clara, Calif.

[22] Filed: Apr. 4, 1974

[21] Appl. No.: 457,863

[52] U.S. Cl. .......................................... 360/40; 360/49

[51] Int. Cl. ............................................... G11b 5/09

[58] Field of Search .............. 360/51, 43, 49, 40, 72

[56] References Cited

UNITED STATES PATENTS

| | | | |
|---|---|---|---|
| 3,641,534 | 2/1972 | Irwin | 360/51 |
| 3,821,798 | 6/1974 | Cannon | 360/51 |

*Primary Examiner*—Vincent P. Canney
*Attorney, Agent, or Firm*—Townsend and Townsend

[57] ABSTRACT

A combined system for detecting sector pulses and data stored in a data processing unit such as a disc file or magnetic tape unit. Data signals occurring at a first frequency and sector pulse signals occuring at a second frequency are passed through a frequency filter. The frequency filter screens all signals lying outside a range centered on the expected sector pulse frequency and excluding the data frequency. The transmitted sector pulse signals are coupled to a sector pulse output unit which generates a sector recognition signal. The data signals are coupled to a polarity change sensor, the output of which generates data signals. The frequency filter also provides raw clocking signals which are delayed and shaped to provide phase comparison signals to the input of a phase lock loop. The output of the phase lock loop generates clocking signals for the polarity change sensor.

8 Claims, 8 Drawing Figures

COMBINED SECTOR PULSE AND DATA DETECTION SYSTEM

BACKGROUND OF THE INVENTION

This invention relates to systems for recovering data recorded in binary form in a data storage unit such as a disc file unit.

Data is frequently recorded on the track of a magnetic disc file having various areas organized into sectors. In order to identify the beginning of a sector, sector signals are typically recorded along a leading portion of a given track. These signals are typically constant frequency signals having a predetermined frequency differing from that of the expected data frequency, the latter being defined as the reciprocal of the data bit interval. Thus, in the process of reading data from a given track of such a storage unit, the sector pulse signals are first generated, followed by the signals representing the data located in that sector. In the past, this arrangement has required the provision of a pair of subsystems; one for detecting sector pulse information; another for decoding the binary information lying in the corresponding sector and the track of interest.

SUMMARY OF THE INVENTION

The invention comprises a combined sector pulse and data detection circuit for generating a signal indicating the location of a sector and also for decoding the data recorded in that sector on the particular track being read. In the preferred embodiment, incoming signals are concurrently supplied to a frequency filter unit and the data input of a polarity change sensor. The output of the frequency filter unit is coupled to circuitry for generating a sector pulse serving to identify a sector. The frequency filter unit prevents the application to the sector pulse detection circuitry of all signals lying outside a predetermined frequency range centered about the expected sector pulse signal frequency and lying outside the expected data frequency.

The frequency filter is also used to generate raw clock signals for clocking the polarity change sensor. These raw clock signals are delayed and shaped to provide a phase comparison signal to the input of a phase lock loop. The output of the phase lock loop is used to clock the polarity change sensor. The polarity change sensor generates data output signals in response to the clock signal input and raw data input signals.

For a fuller understanding of the nature and advantages of the invention, reference should be had to the ensuing detailed description taken in conjunction with the accompanying drawings.

DESCRIPTION OF THE PREFERRED EMBODIMENT

Figure 1:
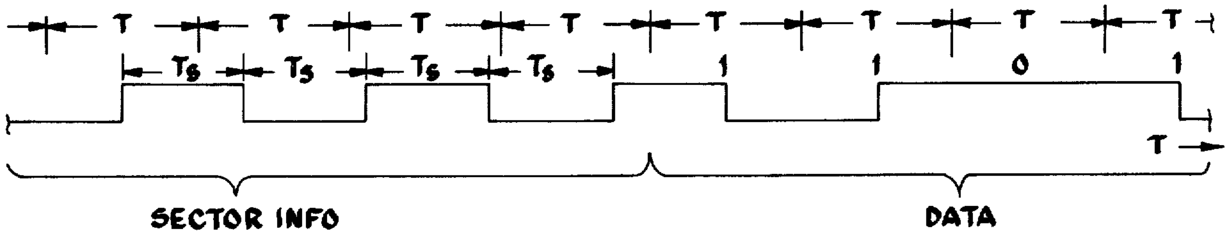
FIG. 1 is a wave form diagram illustrating sector pulse and data input signals.

Turning now to the drawings, FIG. 1 illustrates an incoming signal train having sector information and binary data. As seen in the FIG., the incoming information signals comprise a time-varying signal train having sharp transitions between two amplitude levels. The leading portion of the train contains sector information comprising amplitude reversals which occur at a frequency of $1/t_s$, where $t_s$ is the time interval between adjacent transitions. The follow-up portion of the signal train contains binary data. In the encoding scheme illustrated, a one-bit in the data portion of the signal train is denoted by a transition occurring in the middle of a bit interval $t$ and an $o$ bit is denoted by the absence of such a transition. As will be apparent to those skilled in the art, this arrangement comprises a self-clocking digital encoding scheme. It will be noted that frequency $f_s$ of the sector information is greater than the frequency $f_D$ of the data; preferably $f_s = 1.25\ f_D$.

Figure 2:
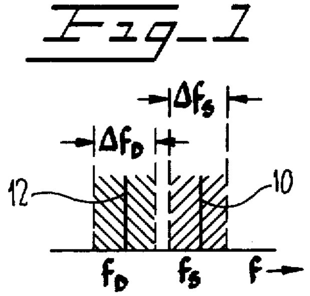
FIG. 2 is a plot illustrating a frequency pass band related to the signals of FIG. 1.

FIG. 2 is a frequency plot illustrating the frequency separation between the sector information and the binary data. Ideally, the sector frequency $f_S$ and the data frequency $f_D$ are both constant and have magnitudes corresponding to solid vertical lines 10, 12 on the frequency scale. In reality, both $f_S$ and $f_D$ are subject to variations $\Delta f_S$ and $\Delta f_D$ caused by variations in the speed of the data track past the read transducers, parametric changes in the electronic circuitry for recovering the information recorded on the magnetic track, etc. The sector pulse and data detector system described below provide a pass band $B = f_S \pm \Delta f_s/2$ for sector pulses which does not overlap the maximum data variation $f_D + \Delta f_D/2$. In the preferred embodiment, this range is $1.1\ f_D \geq B \geq 1.4\ f_D$.

Figure 3:
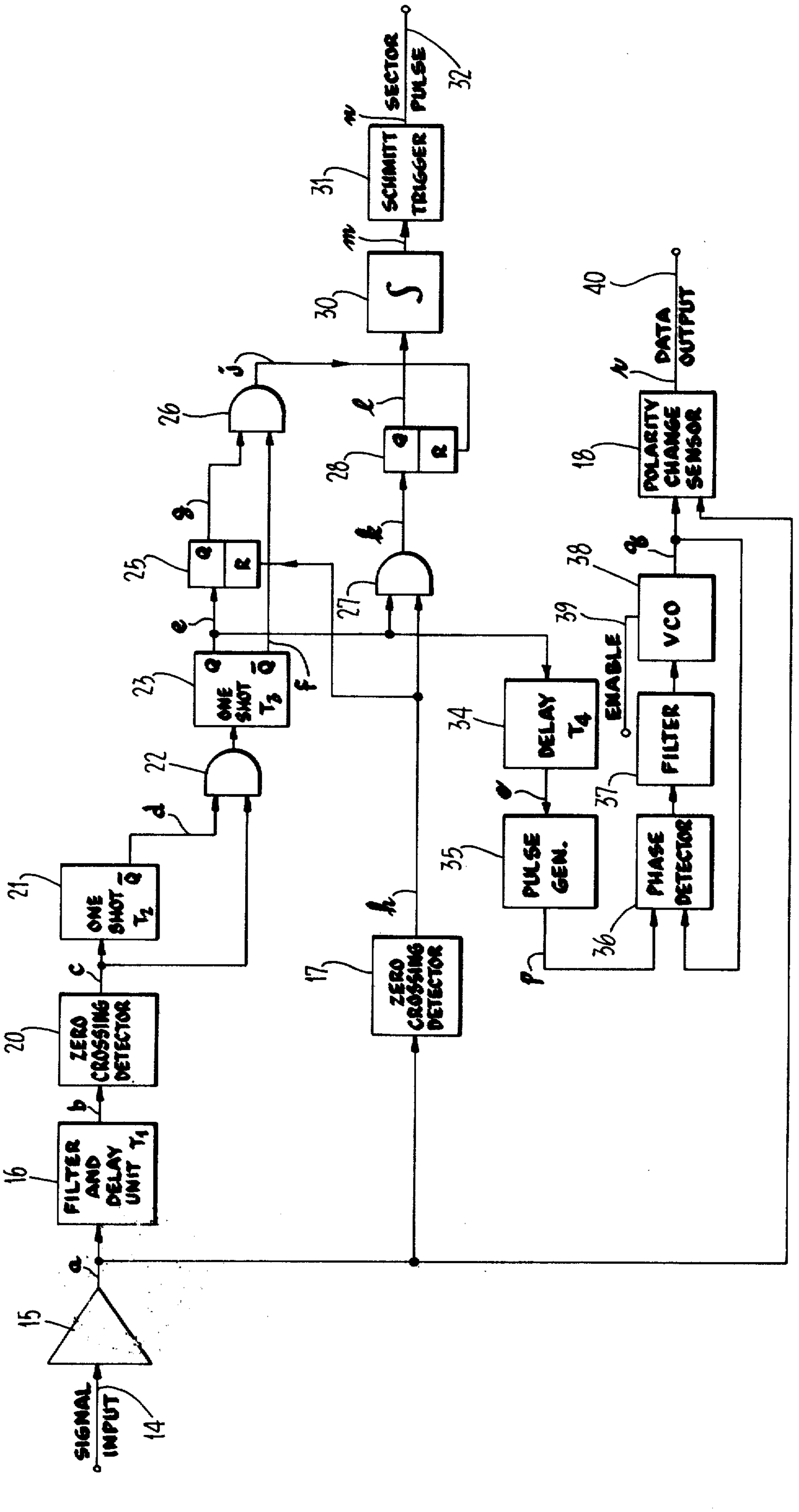
FIG. 3 is a block diagram of the preferred embodiment of the invention.

FIG. 3 is a block diagram of a system constructed according to the present invention for recovering the sector information illustrated in FIG. 1 subject to the frequency variations shown in FIG. 2 and for detecting valid data occurring in the information signal track of FIG. 1. Input signals are coupled by an amplifier 15 to the input of a filter and delay unit 16, a zero crossing detector 17 and to the data input of a polarity change sensor 18. Filter and delay unit 16 is a conventional unit for filtering out spurious high frequency noise pulses and for providing a time delay $t_1$ of a known amount to the signals applied thereto. In the preferred embodiment $t_1 = t$, where t is the data bit interval. The output of filter and delay unit 16 is coupled to the input of a zero crossing detector 20 which is a conventional unit for generating a narrow output pulse of a predetermined width whenever the signal applied to the input thereto changes polarity.

The output of zero crossing detector 20 is coupled to the input of a first one-shot 21 and also to a first input of an AND gate 22. One-shot 21 is a retriggerable monostable multivibrator having a time-out period $t_2$. the $\bar{Q}$ output of one-shot 21 is coupled to the other input of AND gate 22.

The output of AND gate 22 is coupled to the input of a second one-shot 23. One-shot 23 is a monostable multivibrator having a time-out period $t_3$. The Q output of one-shot 23 is coupled to the set input of a first flip-flop 25; the $\bar{Q}$ output of one-shot 23 is coupled to a first input of an AND gate 26. The remaining input to AND gate 26 is obtained from the Q output of flip-flop 25.

The Q output of one-shot 23 is also coupled to a first input of an AND gate 27 along with the output of zero crossing detector 17. Zero crossing detector 17 is a conventional device similar to zero crossing detector 20 which provides a narrow output pulse in response to a change in polarity of the signal input thereto. The output of zero crossing detector 17 is also coupled to the reset input of flip-flop 25. The output of AND gate 27 is coupled to the set input of a flip-flop 28. The output of AND gate 26 is coupled to the reset input of flip-flop 28. The Q output of flip-flop 28 is coupled to the input of a conventional integrator unit 30. The output of integrator 30 is coupled to the level sensing input of a Schmitt trigger unit 31. The output of Schmitt trigger unit 31 is coupled to the sector pulse output terminal 32.

The Q output of one-shot 23 is also coupled to the input of a delay unit 34 which provides a delay $t_4$ to a signal input thereto. The output of delay unit 34 is coupled to the input of a pulse generator 35 which generates a narrow pulse in response to the trailing edge of a signal input thereto.

The output of pulse generator 35 is coupled to a first input of a conventional phase detector 36. The output of phase detector 36 is coupled through a filter 37 to the control input of a voltage controlled oscillator 38, the output of which provides clocking signals for polarity change sensor 18. The output of voltage controlled oscillator 38 is also coupled back to a second comparison input of phase detector 36, so that the frequency of the signal output from VCO 38 is phase locked to the output of pulse generator 35. VCO 38 is provided with an enable input terminal 39 for controlling the state of this element.

Figure 4:
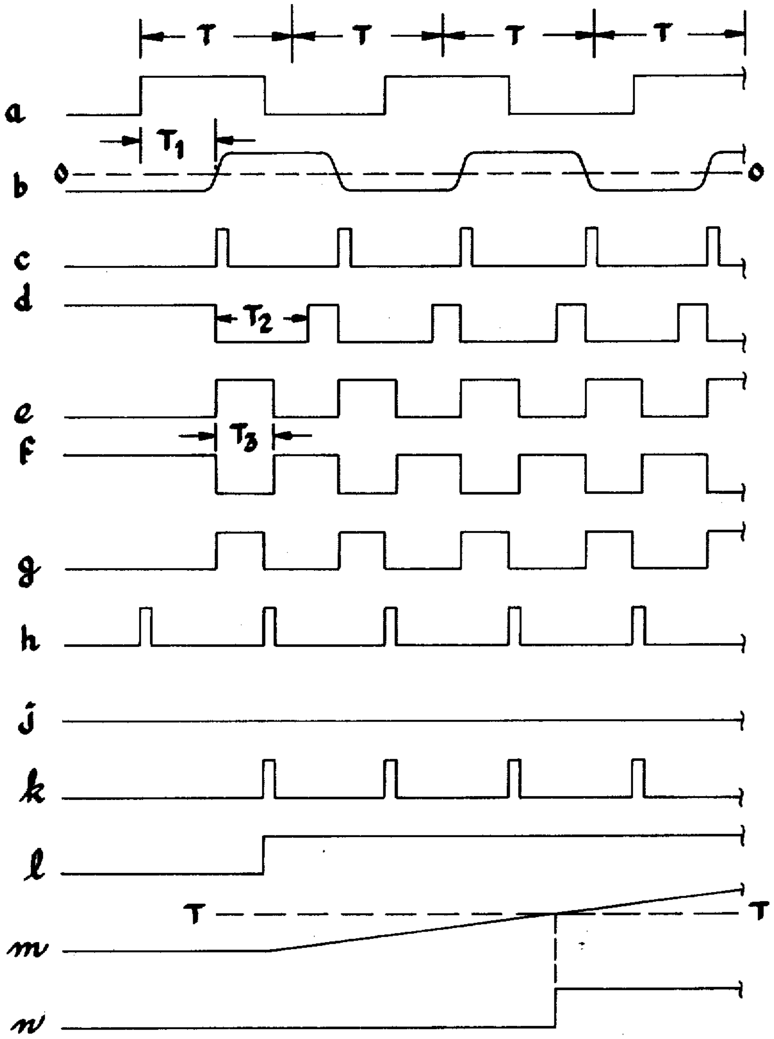
FIGS. 4 and 5 are wave form diagrams illustrating the operation of the FIG. 3 system.

FIG. 4 illustrates the operation of the system of FIG. 3 in response to the input of sector information signals having an ideal frequency $f_S = 1.25\ f_D$. In this FIG., as well as FIGS. 5 and 8, the individual wave forms depicted are taken from the indicated system locations shown in FIG. 3. Input signals from associated read circuitry (not shown) are amplified by amplifier 15 to provide a signal train (wave form *a*) having sharply defined edge transitions. The resulting signal train is passed through filter and delay unit 16 wherein the signal is delayed by one-half t and any spurious high frequency noise is removed. This filtering process removes the square edges from the signal train (waveform *b*). The signal emerging from filter and delay unit 16 is coupled to the input of zero crossing detector 20 which provides a sharply defined narrow output pulse whenever the amplitude of input signal changes polarity (waveform *c*). The leading edge of each pulse in wave form *c* corresponds to the respective zero crossing transition.

The leading edge of each output pulse in wave form *c* triggers one shot 21 which disables AND gate 22 for the duration of the period $t_2$ (waveform *f*). The first pulse in wave form *c*, however, is transmitted through AND gate 22 and triggers one-shot 23. The leading edge of the Q output (waveform *e*) of one-shot 23 sets normally reset flip-flop 25. The Q output (wave form *g*) of flip-flop 25 enables AND gate 26 until flip-flop 25 is reset by a pulse from zero crossing detector 17.

When the second edge of wave form a is applied to the input of zero crossing detector 17, a second pulse (wave form *h*) is generated which resets flip-flop 25 thereby blocking AND gate 26 from resetting flip-flop 28. At the same time, the concurrence of true level signals from Q output of one-shot 23 and the output of zero crossing detector 17 at the input to AND gate 27 results in a pulse at the output of AND gate 27 (wave form *k*) which sets flip-flop 28. The Q output of flip-flop 28 (waveform *l*) is applied to the input of integrator 30 which begins to generate a substantially linear signal of increasing amplitude (waveform *m*) at the output thereof.

After the time interval $t_2$, one-shot 21 times out thereby enabling AND gate 22 to transmit a subsequently received pulse from zero crossing detector 20 corresponding to the next succeeding edge transition in the signal output from amplifier 15. This signal is transmitted by AND gate 22 to trigger one-shot 23, thereby setting flip-flop 25 and enabling AND gate 26. So long as the next succeeding pulse generated by zero crossing detector 17 occurs within the time out period $t_3$ of one-shot 25, flip-flop 25 will be reset before one-shot 23 times out and flip-flop 28 will remain set. So long as flip-flop 28 remains set, the output integrator 30 will continue to increase in a substantially linear manner.

After a predetermined number of transitions of the input signal within the sector frequency tolerance band $\Delta f_S$, the output of integrator 30 attains the threshold level of Schmitt trigger unit 31. When this occurs, the Schmitt trigger unit 31 generates an edge signal (waveform *n*) signifying the impending receipt of data signals. This signal, termed sector pulse, is used to enable appropriate follow-on circuitry (not shown) for processing the data about to be received. In general, the actual number of cycles of the sector information signal required to enable generation of the sector pulse signal by Schmitt trigger unit 31 is much greater than that illustrated in FIG. 4 which is illustrative only.

During the receipt of the sector information signals, the output signals from amplifier 15 are coupled to the data input of polarity change sensor 18. However, during sector detection, VCO 38 is disabled by the absence of an ENABLE signal on conductor 39 so that polarity change sensor 18 is inoperative during this portion of the operation.

After the sector pulse appears on terminal 32, VCO 38 is enabled by the presence of an ENABLE conductor 39, thereby qualifying polarity change sensor 18 to decode data applied thereto from amplifier 15. The ENABLE signal for VCO 38 may be derived from the sector pulse on terminal 32 appropriately shaped and/or delayed, depending on the particular requirements of a given application.

Figure 5:
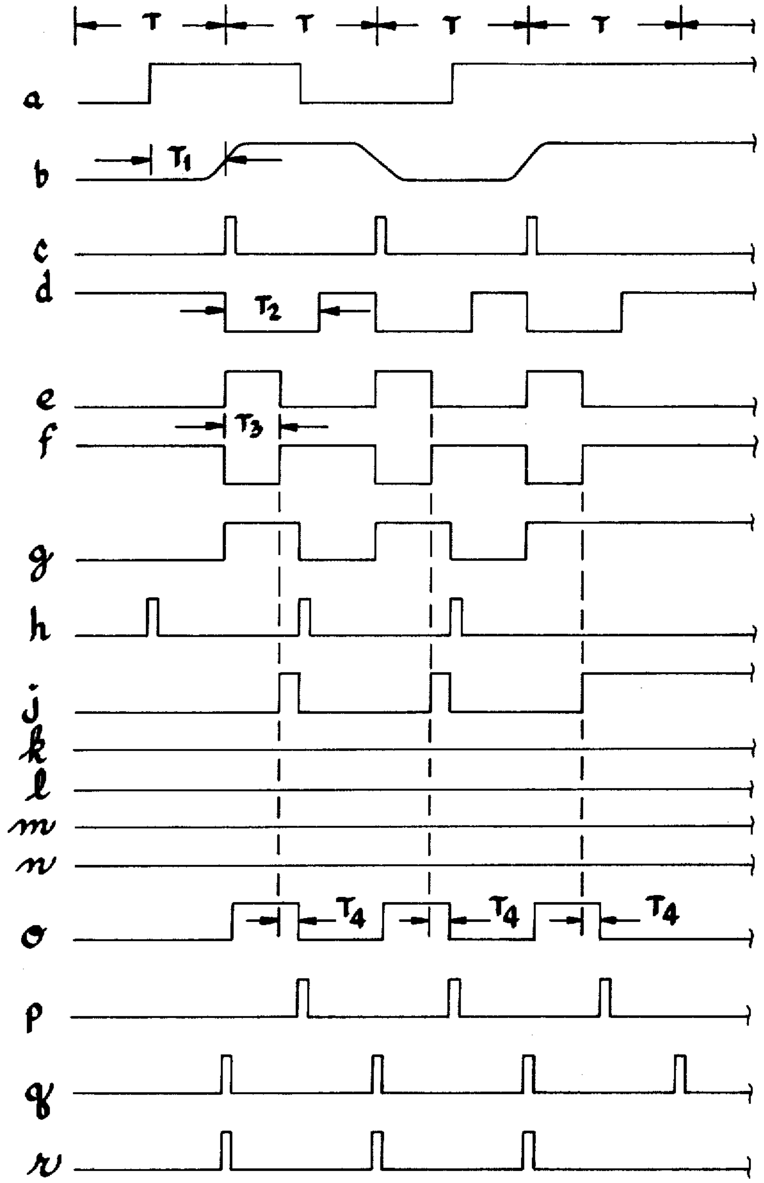

FIG. 5 illustrates the operation of the system of FIG. 3 in response to the receipt of data signals at the input terminal 14. The operation of units 16, 17, 20, 21, 22, 23, 25 and 26 is similar to that described above with reference to FIG. 4. However, in contract to the operation of the system in response to sector information, when valid data signals are being received a pulse is generated by zero crossing detector 17 (wave form *h*) only after the time out period $t_3$ of single-shot 23. This is due to the lower frequency $f_D$ of the data signals relative to the frequency $f_S$ of the sector information signals. Since one-shot 23 times out before the appearance of this pulse, AND gate 26 generates a reset pulse at the output thereof which resets flip-flop 28, thereby terminating operation of integrator 30. In addition, since one-shot 23 times out before the appearance of the pulse from zero detector 17, AND gate 27 is disabled when this latter pulse appears so that flip-flop 28 remains reset. This terminates the operation of the sector pulse generation portion of the system.

The Q output of one-shot 23 is delayed by delay unit 34 for time period $t_4$ and is applied to the input of pulse generator 35 as noted above. Pulse generator 35 generates a narrow sharp pulse in response to the trailing edge of delay unit 34. Thus, the combined effect of units 16, 23, 34 and 35 is to delay a data transition by a total time interval $T = t_1 + t_3 + t_4$. This interval is chosen so that $T = t$, the expected data period.

The output of pulse generator 35, which is a data pulse delayed by the data period t, is applied as a phase reference input signal to the phase lock loop comprising elements 36, 37 and 38. With VCO 38 enabled via the signal on terminal 39, the output of the phase lock loop is a clock signal (waveform $q$) consisting of a train of clock pulses spaced at data intervals t and occurring at the boundaries of the intervals. These clock signals are applied to the clock input of polarity sensor 18 which samples the data input thereto from amplifier 15 to determine whether a polarity change has occurred over the data bit interval t. If such a change has occurred, a pulse is generated at the output of polarity change sensor 18 which is coupled to the data output terminal 40 (waveform $r$). If no such polarity change has occurred, no pulse is generated-corresponding to a zero bit.

Figure 6:
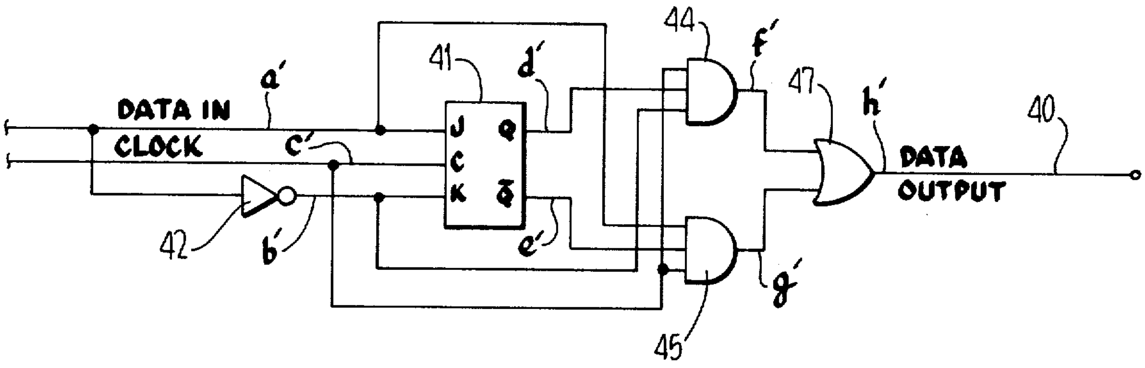
FIG. 6 illustrates a polarity change sensor.

FIG. 6 illustrates a polarity change sensor circuit suitable for use in the system of FIG. 3. A J-K type flip-flop 41 is connected as shown with the signal train from amplifier 15 coupled to a first data input and the same signal train inverted by an inverter 42 coupled to the other data input of flip-flop 41. The Q output of flip-flop 41 is coupled to an input of a first AND gate 44 along with clock signals from VCO 38 and the inverted data signals. The $\bar{Q}$ output of flip-flop 41 is coupled to an input of a second AND gate 45 along with clock signals and the data signal train. The respective outputs of AND gates 44 and 45 are coupled to the inputs of an OR gate 47, the output of which is coupled to the data output terminal 40.

Figure 7:
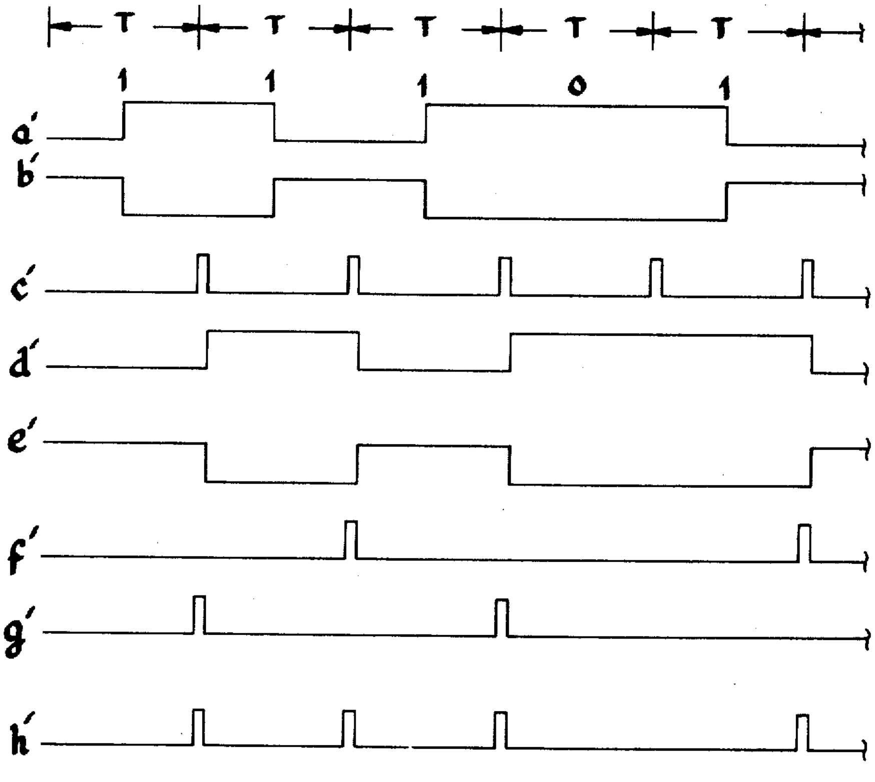
FIG. 7 is a wave form diagram illustrating the operation of the sensor of FIG. 6.

With reference to FIGS. 6 and 7, in operation flip-flop 41 is set by the concurrence of a true level data signal (waveform $a'$) and a clock pulse (waveform $c'$). This transition occurs on the trailing edge of the clock pulse. When the leading edge of the succeeding clock pulse appears at the input of AND gate 44, the concurrence of Q true (waveform $d'$), the clock pulse and data signal true (waveform $b'$), signifying the data has changed polarity over the data interval between clock pulses, results in the generation of a positive pulse at the output of AND gate 44 (waveform $f'$). This pulse is transmitted through OR gate 47 to data output terminal 40 (waveform $h'$). After generation of this pulse, flip-flop 41 is switched to the opposite state by the trailing edge of the same clock pulse.

When the next succeeding clock pulse appears, the concurrence of the leading edge of this pulse, together with the Q true (waveform $e'$) and data signal true at the input to AND gate 45 results in the generation of a pulse at the output thereof, (waveform $g'$), which is transmitted by OR gate 47 to the data output terminal 40 (waveform $h'$). After generation of this pulse, flip-flop 41 is switched to the opposite state by the trailing edge of the same clock pulse. In this manner the first three one bits of data are generated on data output terminal 40.

When a zero succeeds a one bit, operation of the circuit of FIG. 6 proceeds as follows. When the leading edge of the clock pulse appears at the end of the zero bit interval, the data signal input to AND gate 44 is false so that no pulse is generated at the output thereof. In addition, the $\bar{Q}$ input to AND gate 45 is false, so that no output pulse is generated at the output thereof. Thus, no pulse appears on data output terminal 40. When the trailing edge of the clock pulse occurs, flip-flop 41 does not change to the opposite state.

When the next succeeding one bit appears in the data signal, the concurrence of data signal true, the leading edge of the clock pulse and Q true causes AND gate 44 to generate a positive pulse which is transmitted via OR gate 47 to terminal 40. After generation of this pulse, flip-flop 41 is switched to the opposite state by the trailing edge of the clock pulse. Further operation proceeds in the manner described above.

In summary, the polarity change sensor of FIG. 6 generates a positive pulse for each one bit in the data signal train and generates no pulse for each zero bit in the data signal train.

Figure 8:
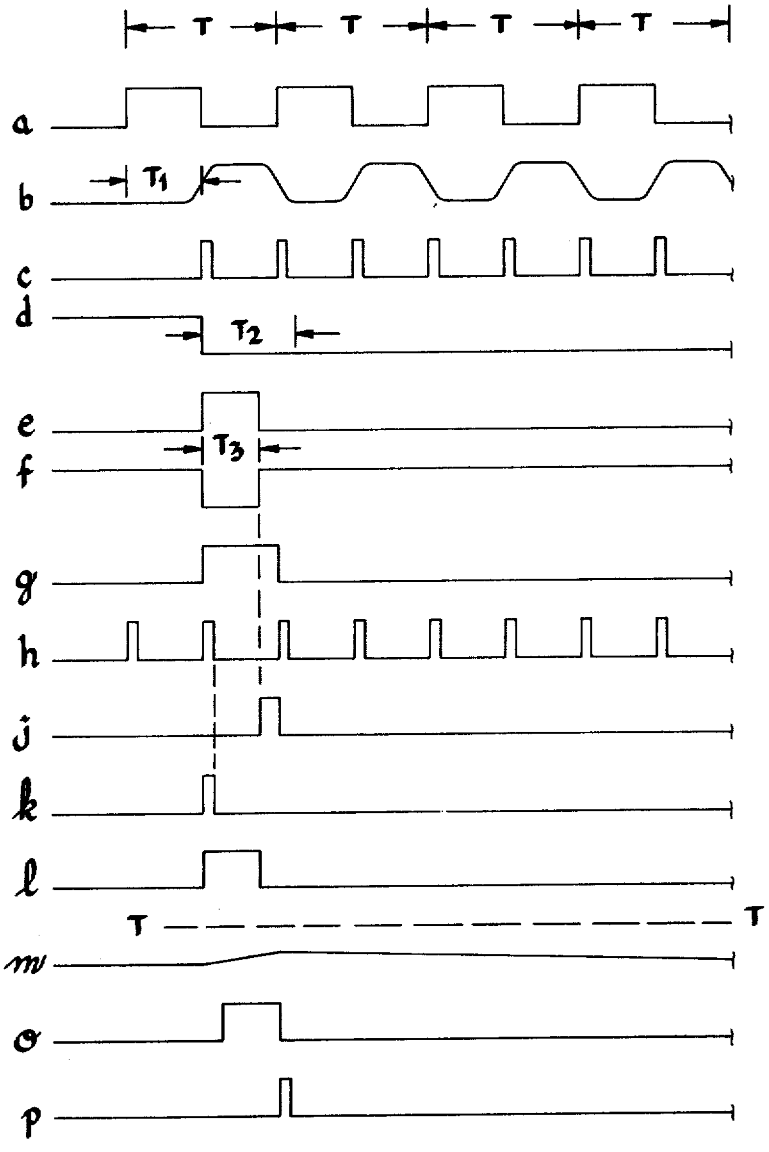
FIG. 8 is a wave form diagram further illustrating the operation of the circuit of FIG. 3.

FIG. 8 illustrates the operation of the system of FIG. 3 in response to the receipt of invalid signals occurring at a frequency lying above the upper limit $f_s + \Delta f_s/2$ of the frequency pass band of the sector pulse detector portion of the system. In the example illustrated, the incoming signals are represented as having a frequency equal to $2f_D$. The incoming signals shaped by amplifier 15 (wave form a) are delayed by an interval $t_1$ by filter and delay unit 16 (waveform b) and applied to the input of zero crossing detector 20. The narrow output pulses from zero crossing detector 20 (waveform c) are applied to the trigger input of one-shot 21 and AND gate 22. The first pulse applied to the input of AND gate 22 triggers one-shot 23. The succeeding input pulses to one-shot 22 cause this element to be retriggered before the time out period $t_2$, so that AND gate 22 is blocked from being triggered by the succeeding pulses of frequency $2f_D$ (waveform $e$).

The concurrence of Q true from one-shot 23 and a pulse from zero crossing detector 17 (waveform h) causes AND gate 27 to generate a single output pulse (waveform k) which sets flip-flop 28 (waveform l), thereby initiating operation of integrator unit 30. However, when one shot 23 times out before the next-succeeding output pulse from zero crossing detector 17, AND gate 26 generates a pulse at the output thereof (waveform $j$) which resets flip-flop 28, thereby terminating operation of integrator unit 30 before the output signal therefrom (waveform m) reaches the threshold sensing level of Schmitt trigger unit 31. Since one-shot 23 is thereafter blocked from being retriggered by one-shot 21, flip-flop 28 remains reset so that no second pulse signal appears at sector pulse output terminal 32, and thus VCO 38 of the phase lockloop is maintained in the disabled condition.

As will now be apparent, the sector detector portion of the system of FIG. 3 is insensitive to signals having a frequency lying above the upper limit of the frequency transmission band $f_S + \Delta f_S/2$. In the preferred embodiment, the upper frequency limit of the system is fixed at about 1.4 $f_D$. If desired, other upper limits may be set depending on the requirements of a particular application by merely adjusting the time out interval $t_2$ of one-shot 21. Similarly, signals lying below the lower limit of the sector detector frequency transmission band $f_S - \Delta f_S/2$ are screened out by the operation of one-shot 23. In the preferred embodiment this lower limit is about 1.1 $f_D$. If desired, other lower limits may be provided by adjusting the time out period $t_3$ of one-shot 23.

As will now be apparent, the above-described invention provides frequency discrimination of sector information signals over a predetermined range which may be centered about the sector information frequency by simply adjusting the time out period of a pair of one-shot circuits. In addition, single-shot 23, which provides the low frequency cut-off for sector detection, also provides raw clock signals for the input of the phase lock loop used for data detection.

While the above provides a full and complete disclosure of the preferred embodiment of the invention, various modifications, alternate constructions, and equivalents may be employed without departing from the spirit and scope of the invention. Therefore, the above description and illustrations should not be construed as limiting the scope of the invention which is defined by the appended claims.

What is claimed is:

1. A sector identification and data detector system comprising:

an input terminal adapted to receive an input signal train bearing sector identification and data signals, said sector signals having a frequency $f_S$ greater than the frequency $f_D$ of said data signals;

frequency gating means coupled to said input terminal for generating a sector identification signal in response to the receipt thereof of signals lying in the range $f_S \pm \Delta f_s/2$ where $\Delta f_S$ is a predetermined permitted frequency deviation, said frequency gating means including:

a first delay unit coupled to said input terminal for delaying said input signals by a first interval $t_1$, and a first zero crossing detector coupled to said first delay unit for generating an output pulse in response to a change of polarity of the signals input thereto;

first means for screening out input signals lying below the frequency $f_S - \Delta f_S/2$, said first screening means including an AND gate having a first input coupled to the output of said zero crossing detector, and a first monstable multivibrator having a time-out interval $t_2$, said multivibrator having an input coupled to said zero crossing detector and an output coupled to said AND gate for blocking transmission of signals therethrough during said time-out interval $t_2$;

second means for screening out input signals lying above the frequency $f_S + \Delta f_S/2$; and means for terminating said sector identification signal when the frequency of said input signals lies outside said range;

means coupled to said input terminal for decoding said data signals;

phase lock loop means for clocking said decoding means; and means coupled to said frequency gating means for supplying a phase reference signal to said phase lock loop means.

2. The system of claim 1 wherein said second screening means includes a second monostable multivibrator having a time out interval $t_3$, an input coupled to the output of said AND gate, and an output; a second zero crossing detector having an input coupled to said input terminal for generating a pulse in response to a change in polarity in said input signal train; an AND gate having an input coupled to said output of said second monostable multivibrator, a second input coupled to the output of said second zero crossing detector and an output; a first flip-flop having an input coupled to the output of said AND gate and an enabling output; and means coupled to said second monostable multivibrator for switching said first flip-flop to the opposite state to thereby terminate said enabling signal whenever the pulse output from said second zero crossing detector occurs later than said time out period $t_3$ of said monostable multivibrator.

3. The system of claim 2 wherein said frequency gating means further includes an integrator coupled to said output of said second flip-flop and a level detector coupled to the output of said integrator for generating a second identification signal whenever the level of the input signal thereto rises above a predetermined threshold.

4. The system of claim 2 wherein said phase reference signal supplying means comprises a second delay unit having an input coupled to an output of said second monostable multivibrator and providing a delay $t_4$, and a pulse generator having an input coupled to the output of said second delay unit for generating a pulse in response to receipt of a signal from said delay unit.

5. The system of claim 1 wherein said data decoding means comprises a polarity change sensor having a data input coupled to said input terminal and a clock input coupled to the output of said phase lock loop means.

6. The system of claim 4 wherein the delay intervals provided by said first delay unit, said second monostable multivibrator and said second delay unit are selected to provide a total signal delay $T = t_1 + t_3 + t_4 = t$, where $t$ is the expected data bit interval.

7. A sector identification and data detector system comprising:

an input terminal adapted to receive input signals bearing sector and data signals, said sector signals having an expected frequency $f_S$ greater than the expected frequency $f_D$ of said data signals;

a first delay unit having an input coupled to said input terminal and providing a first delay interval $t_1$ for signals applied at the input thereto;

a first zero crossing detector having an input coupled to the output of said first delay unit for generating an output pulse in response to a change in plurality of the signal input thereto;

a first monostable multivibrator having a time out interval $t_2$ and having an input coupled to the output of said first zero crossing detector;

a first AND gate having a first input coupled to the output of said first zero crossing detector and a second input coupled to an output of said first monostable multivibrator;

a second monostable vibrator having a time-out interval $t_3$ and having an input coupled to the output of said first AND gate;

a first flip-flop having an input coupled to an output of said second monostable multivibrator;

a second AND gate having a first input coupled to an output of said first flip-flop and a second input coupled to the other output of said second monostable multivibrator;

a second zero crossing detector having an input coupled to said input terminal for generating an output pulse whenever the signal input thereto changes polarity, a third AND gate having a first input coupled to the first output of said second monostable multivibrator and a second input coupled to the output of said second zero crossing detector;

a second flip-flop having a first input coupled to the output of said third AND gate and a second input coupled to the output of said second AND gate;

an integrator having an input coupled to the output of said second flip-flop;

a level detector having an input coupled to the output of said integrator;

a phase lock loop having first and second phase reference inputs and a voltage controlled oscillator for generating clocking signals, said first phase reference input being coupled to the output of said voltage controlled oscillator;

a polarity change sensor having a data input coupled to said input terminal and a clock input coupled to the output of said voltage controlled oscillator;

and means having an input coupled to said first output of said second monostable multivibrator for generating a second phase reference signal, said last-named means having an output coupled to said second phase reference input of said phase lock loop.

8. The system of claim 7 wherein said last-named means comprises a second delay unit having an input coupled to said first output of said second monostable multivibrator and an output; and a pulse generator having an input coupled to said last-named output and an output coupled to said second phase reference input of said phase lock loop.

* * * * *